United States Patent [19]

Buter

[11] 4,254,185

[45] Mar. 3, 1981

[54] LIQUID COATING COMPOSITION BASED ON AN ESTER THIOL AND AN AMINOPLAST, A PROCESS FOR COATING A SUBSTRATE WITH SUCH A COMPOSITION, AND THE SUBSTRATE THUS MANUFACTURED

[75] Inventor: Roelof Buter, Dieren, Netherlands

[73] Assignee: Akzo N.V., Arnhem, Netherlands

[21] Appl. No.: 23,303

[22] Filed: Mar. 23, 1979

[30] Foreign Application Priority Data

Mar. 31, 1978 [NL] Netherlands ......................... 7803423

[51] Int. Cl.$^3$ ........................ B32B 15/08; B32B 27/42
[52] U.S. Cl. .................................. 428/460; 427/385.5; 427/388.3; 428/524; 528/242; 528/268
[58] Field of Search .............. 427/388 B, 385.5, 388.3; 528/242, 268; 428/524, 460

[56] References Cited

U.S. PATENT DOCUMENTS

| | | | |
|---|---|---|---|
| 3,578,614 | 5/1971 | Wszolek | 204/159.18 X |
| 3,662,022 | 5/1972 | Lard | 526/313 X |
| 4,081,416 | 3/1978 | Brenschot et al. | 428/524 X |
| 4,089,827 | 5/1978 | Massy et al. | 428/460 X |

Primary Examiner—Michael R. Lusignan
Assistant Examiner—Thurman K. Page
Attorney, Agent, or Firm—Stevens, Davis, Miller & Mosher

[57] ABSTRACT

The invention relates to a liquid coating composition based on an aminoplast and an ester thiol built up from a polyol and a mercaptocarboxylic acid having 2 to 7 carbon atoms. The invention also relates to a process for coating a substrate with such a composition, and to the substrate thus manufactured.

5 Claims, No Drawings

LIQUID COATING COMPOSITION BASED ON AN ESTER THIOL AND AN AMINOPLAST, A PROCESS FOR COATING A SUBSTRATE WITH SUCH A COMPOSITION, AND THE SUBSTRATE THUS MANUFACTURED

This invention relates to a liquid coating composition based on a binder and an aminoplast curing agent. From the British Patent No. 1 489 288, compositions are known in which the binder is a polyester which has at least two mercaptan groups per molecule and at least one acyl group having an alkyl group with 8 to 60 carbon atoms. These known polyesters have an average molecular weight in the range of 800 to 40000.

The coating composition according to the invention is characterized in that the binder is an ester thiol of the general formula:

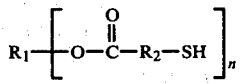

where $R_1$ represents the group which is formed by abstraction of hydroxyl groups from a polyhydroxy compound having 2 to 18 carbon atoms, and $R_2$ represents a hydrocarbon group having 1 to 6 carbon atoms, and n has a value of 2-4, the ester thiol having a number average molecular weight of 178 to 600.

It should be added that the ester thiols are known in itself from U.S. Patent Specification No. 3,662,022, namely as a component of a mixture including a specified α,β-ethylenically unsaturated monocarboxylic acid and a specified bisepoxy compound. This known mixture is exclusively cured by radiation or by chemically induced free radicals.

The ester thiols are on the one hand built up from one or more aliphatic, cycloaliphatic or araliphatic polyhydroxy compounds having 2, 3 and 4 hydroxyl groups and 2 to 18 carbon atoms, and on the other hand from one or more aliphatic, cycloaliphatic or aromatic mercaptocarboxylic acids having 2 to 7 carbon atoms and/or an anhydride or alkyl ester thereof, the alkyl group generally containing 1 to 8 carbon atoms.

As examples of suitable polyhydroxy compounds may be mentioned ethylene glycol; 1,2-propane diol; 1,3-propane diol; 2,2-dimethyl-1,3-propane diol; 1,2-butane diol; 1,3-butane diol; 1,4-butane diol; 1,6-hexane diol; triethylene glycol; 2-ethyl-1,6-hexane diol; 3-methyl-1,5-pentane diol; 2,2,4-trimethyl-1,6-hexane diol; 2,4,4-trimethyl-1,6-hexane diol; pentaerythritol; 1,1,1-trimethylol ethane; 1,1,1-trimethylol propane; 2,2-bis(4-hydroxycyclohexyl) propane; 1,4-bis(hydroxymethyl) cyclohexane and the neopentyl glycol ester of hydroxy pivalic acid or mixtures of the above-envisaged compounds.

As examples of suitable mercaptocarboxylic acids may be mentioned 2-mercaptoacetic acid, 2-mercaptopropionic acid, 3-mercaptopropionic acid and 2-mercaptobenzoic acid. It is preferred that use should be made of a mercaptopropionic acid.

The ester thiols to be used according to the invention may be prepared in any convenient manner. One or more polyhydroxy compounds may be reacted with one or more mercaptocarboxylic acids, an anhydride and/or an alkyl ester thereof, the molar ratio of the hydroxyl groups to the carboxyl groups or derivatives thereof being about 1:1. The esterification reaction takes place at elevated temperature, for instance at 80° to 250° C., optionally in the presence of one or more organic solvents such as toluene and xylene. The reaction will as a rule be carried out in the presence of an esterification catalyst in the usual concentration. The catalyst may be of the usual type, for instance and acid catalyst such as p-toluene sulphonic acid, a basic compound such as an amine or compounds such as zinc oxide, tetraisopropyl orthotitanate and triphenyl benzyl phosphonium chloride.

Generally suitable curing agents for the ester thiols according to the invention are N-methylol groups- and/or N-methylol ether groups containing aminoplasts, which are obtained by reacting an aldehyde, for instance formaldehyde, with an amino groups- or amido groups-containing compound such as melamine, urea, N,N'-ethylene urea, dicyandiamide and benzoguanamine; for the preparation of these compounds, see for instance: Houben-Weyl, Methoden der Organischen Chemie, Volume 14/2, pp. 319-371 (1963). It is preferred that the above described compounds should entirely or partly be etherified with alcohols having 1 to 6 carbon atoms, for instance with methanol, ethanol, n-propanol, isopropanol, n-butanol, isobutanol, amyl alcohol, hexanol or mixtures of the above-envisaged alcohols. Preferably use should be made of a methylol melamine having 4 to 6 methylol groups per melamine molecule, at least 3 methylol groups being etherified with, for instance, methanol, ethanol or butanol, or a condensation product of formaldehyde and N,N'-ethylene diurea etherified with butanol. More particularly, use may be made of a hexalkoxymethyl melamine in which the alkoxy group has 1 to 4 carbon atoms.

The curing agent is generally used in such an amount that the molar ratio of the mercapto groups of the ester thiol to the reactive groups of the curing agent is in the range of approximately 0,7 to 1,5.

The coating composition may contain one or more pigments, dyes and usual adjuvants and additives, for instance: pigment dispersing agents, sag-control agents, other agents influencing the rheological properties, gloss improving agents and compounds that promote the curing reaction, such as p-toluene sulphonic acid or blocked products of these accelerators.

The coating composition may be applied to the substrate in any convenient manner, for instance by roller coating, spraying, brushing, sprinkling, flow-coating or dipping.

The coating composition according to the invention is ready for use without requiring the addition of thinners or solvents and generally has a viscosity in the range of 50 mPa.s to 1 Pa.s and not more than 2 Pa.s. Optionally, however, the composition may contain a small amount of solvent of, for instance, generally not more than 20% by weight.

The coating composition may be cured or baked in the usual manner, for instance at the usual temperatures in the range of 100° to 160° C. But the coating composition is particularly suitable to be baked at lower temperatures, for instance in the range of 60° to 100° C., over a period of 20 to 60 minutes in a baking oven.

In the examples use is made of ester thiols prepared by esterification of the mercaptocarboxylic acids with the polyhydroxy compounds mentioned in Table 1. In each case a mixture of 1 mole of the polyhydroxy compound, x moles of the mercaptocarboxylic acid, where x represents the functionality of the polyhydroxy compound, and 0,5 grammes of tetraisopropylorthotitanate, is reacted for two hours at a temperature of 150°–180° C.

TABLE 1

| Ester thiol | Mercaptocarboxylic acid | Polyhydroxy compound |
|---|---|---|
| I | 2-mercaptoacetic acid | 1,4-bis(hydroxymethyl) cyclohexane (BHMCH) |
| II | 2-mercaptoacetic acid | 2,2-dimethyl-1,3-propane diol |
| III | 2-mercaptoacetic acid | 1,6-hexane diol (HD) |
| IV | 2-mercaptoacetic acid | mixture of BHMCH and HD in a molar ratio of 2:1 |
| V | 3-mercaptopropionic acid | BHMCH |
| VI | 3-mercaptopropionic acid | 2,2,4-trimethyl-1,6-hexane diol |
| VII | 2-mercaptobenzoic acid | 3-methyl-1,5-pentane diol |
| VIII | 2-mercaptoacetic acid | 1,1,1-trimethyl propane |
| IX | 3-mercaptopropionic acid | 2,2-bis-(4-hydroxycyclohexyl) propane |

In the following examples, which must not be regarded as limiting the scope of the present invention, the Persoz hardness was measured and the values obtained expressed in seconds. An acceptable minimum hardness value is about 200 seconds. The flexibility was determined with a "falling-weight" coating tester (Erichsen type 304) in accordance with ASTM D2794-69, using a weight of 0,908 kg measuring 15,9 mm in diameter and having a dropping opening of 16,3 mm, the value obtained being expressed in kg.cm. In conformity with this method the values were determined both for the coated side and the back of the steel test panel (Bonder 120). An acceptable minimum for the flexibility is a value of the order of 10 kg.cm. The gloss was determined at 60° and 20° geometry (ASTM D-523). A gloss value at 60° of over 90 is high. A gloss value at 20° of over 80 is also considered to be high. The values of the measured properties are listed in Table 2.

The spray compositions described in the examples all had a viscosity at 20° C. of 20 to 40 seconds (Ford Cup No. 4). The solids content of the coating compositions used in the examples was approximately 90% by weight (determined in conformity with ASTM method D 1644-59 and by heating for 1 hour at 105° C.). Table 2 gives the film thicknesses of the compositions after baking.

The pigment dispersion used in the examples was prepared by intermixing 24 parts by weight of titanium dioxide, 1,5 parts by weight of a pigment dispersing agent (a polyacrylate having a high molecular weight), 7,5 parts by weight of hexamethoxymethyl melamine and 3,0 parts by weight of xylene and grinding the resulting mixture in a "Red-Devil" shaking machine and subsequently filtering it off.

EXAMPLE 1

The following components were homogeneously intermixed:

| | |
|---|---|
| ester thiol I | 22,5 g |
| pigment dispersion | 36 g |
| hexamethoxymethyl melamine | 3,5 g |
| p-toluene sulphonic acid | 0,24 g |

The coating composition obtained was applied to a steel panel pretreated with zinc phosphate (Bonder 120) and cured for 30 minutes at 130° C. The properties of the baked coating film are mentioned in Table 2.

EXAMPLE 2

The procedure of Example 1 was repeated, except that use was made of 0,48 g of p-toluene sulphonic acid, and the coating composition was cured at a temperature of 80° C. The properties of the baked coating film are mentioned in Table 2.

EXAMPLE 3

The procedure of Example 1 was repeated, except that use was made of 0,60 g of p-toluene sulphonic acid, and the coating compositon was cured at a temperature of 70° C. The properties of the baked coating film are mentioned in Table 2.

EXAMPLE 4

The procedure of Example 1 was repeated, except that use was made of 21,5 g of the ester thiol II instead of 22,5 g of the ester thiol I, and the hexamethoxymethyl melamine was used in an amount of 4,5 g instead of 3,5 g. The properties of the baked coating film are mentioned in Table 2.

EXAMPLE 5

The procedure of Example 4 was repeated, except that use was made of 0,60 grammes of p-toluene sulphonic acid, and the coating composition was cured at a temperature of 80° C. The properties of the baked coating film are mentioned in Table 2.

EXAMPLE 6

The procedure of Example 1 was repeated, except that use was made of 21,5 g of the ester thiol III instead of 22,5 g of the ester thiol I, and the hexamethoxymethyl melamine was used in an amount of 4,5 g instead of 3,5 g. The properties of the baked coating film are listed in Table 2.

EXAMPLE 7

The procedure of Example 6 was repeated, except that use was made of 0,60 g of p-toluene sulphonic acid, and the coating composition was cured at a temperature of 80° C. The properties of the baked coating film are mentioned in Table 2.

EXAMPLE 8

The procedure of Example 1 was repeated, except that use was made of 22,5 g of the ester thiol IV instead of 22,5 g of the ester thiol I, and the coating composition was cured at a temperature of 110° C. The properties of the baked coating film are mentioned in Table 2.

EXAMPLE 9

The procedure of Example 1 was repeated, except that use was made of 20,5 g of the ester thiol V instead of 22,5 g of the ester thiol I, and the hexamethoxymethyl melamine was used in an amount of 5,5 g instead of 3,5 g. The properties of the baked coating film are mentioned in Table 2.

EXAMPLE 10

The procedure of Example 9 was repeated, except that use was made of 0,60 g of p-toluene sulphonic acid, and the coating composition was cured at a temperature of 80° C. The properties of the baked coating film are listed in Table 2.

EXAMPLE 11

The procedure of Example 1 was repeated, except that use was made of 20,5 g of the ester thiol VI instead of 22,5 g of the ester thiol I, and the hexamethoxymethyl melamine was used in an amount of 5,5 g instead of 3,5 g. The properties of the baked coating film are given in Table 2.

EXAMPLE 12

The same procedure was employed as in Example 11, except that use was made of 0,60 g of p-toluene sulphonic acid, and the coating composition was cured at a temperature of 80° C. The properties of the baked coating film are listed in Table 2.

EXAMPLE 13

The same procedure was employed as in Example 1, except that use was made of 22,5 g of the ester thiol VII instead of 22,5 g of the ester thiol I. The properties of the baked coating film are mentioned in Table 2.

EXAMPLE 14

The same procedure was used as in Example 13, except that use was made of 0,60 g of p-toluene sulphonic acid, and the coating compositon was cured at a temperature of 80° C. The properties of the baked coating film are listed in Table 2.

EXAMPLE 15

The same procedure was employed as in Example 1, except that use was made of 21,5 g of the ester thiol VIII instead of 22,5 g of the ester thiol I, and the hexamethoxymethyl melamine was used in an amount of 4,5 g instead of 3,5 g. The properties of the baked coating film are mentioned in Table 2.

EXAMPLE 16

Example 15 was repeated, except that use was made of 0,60 g of p-toluene sulphonic acid, and the coating composition was cured at a temperature of 80° C. The properties of the baked coating film are mentioned in Table 2.

EXAMPLE 17

The same procedure was employed as in Example 1, except that use was made of 24,5 g of the ester thiol IX instead of 22,5 g of the ester thiol I, and the hexamethoxymethyl melamine was used in an amount of 2,5 g instead of 3,5 g and the p-toluene sulphonic acid in an amount of 0,3 g, and the coating composition was cured at a temperature of 100° C. The properties of the baked coating film are listed in Table 2.

EXAMPLE 18

The same procedure was employed as in Example 17, except that use was made of 0,60 g of p-toluene sulphonic acid, and the coating compositon was cured at a temperature of 80° C. The properties of the baked coating film are mentioned in Table 2.

TABLE 2

| Example | Film thickness (μm) | Persoz hardness (sec.) | Falling weight test (kg. cm) coated side | Falling weight test (kg. cm) back | Gloss 60° | Gloss 20° |
|---|---|---|---|---|---|---|
| 1 | 40 | 296 | 18 | <2 | 100 | 95 |
| 2 | 50 | 284 | 18 | <2 | >100 | 97 |
| 3 | 40 | 252 | 18 | <2 | >100 | 98 |
| 4 | 40 | 300 | 16 | <2 | 95 | 87 |
| 5 | 40 | 286 | 14 | <2 | >100 | 96 |
| 6 | 35 | 293 | 23 | <2 | 95 | 86 |
| 7 | 40 | 260 | 30 | 2 | >100 | 95 |
| 8 | 40 | 264 | 34 | 7 | 93 | 86 |
| 9 | 50 | 299 | 23 | <2 | 88 | 74 |
| 10 | 40 | 263 | 34 | 2 | 100 | 88 |
| 11 | 50 | 255 | 80 | 32 | 82 | 63 |
| 12 | 45 | 152 | 80 | 60 | 78 | 30 |
| 13 | 50 | 315 | 9 | <2 | >100 | >100 |
| 14 | 35 | 302 | 12 | <2 | 100 | 82 |
| 15 | 35 | 306 | 14 | <2 | 100 | 90 |
| 16 | 50 | 286 | 12 | <2 | 100 | 87 |
| 17 | 40 | 275 | 14 | <2 | 90 | 85 |
| 18 | 40 | 276 | 23 | <2 | >100 | 95 |

What is claimed is:

1. A method for coating a substrate which comprises (1) applying to the substrate a substantially anhydrous composition which is adapted for application to the substrate when (a) and (b) are 100% of the compsition's binder and the binder
   (a) is an ester thiol having the formula $R_1[O-CO-R_2-SH]_n$ wherein $R_1$ is a radical formed by removal of hydroxyl groups from an organic polyhydroxyl compound having 2 to 18 carbon atoms and $R_2$ is a saturated hydrocarbon radical having 1 to 6 carbon atoms or an aromatic ring having 6 carbon atoms, n is an integer of 2 to 4 and the molecular weight is from 178 to 600; and
   (b) is an aminoplast curing agent; and
   (2) heating the resulting coating until cured.

2. The method of claim 1 wherein the composition consists essentially of (a) and (b) in a ratio which provides about 0.7 to about 1.5 mercapto groups per group on the curing agent reactive therewith and the composition is curable at 60° C. to 100° C.

3. The method of claim 2 wherein (a) is prepared by reaction of an organic polyhydroxyl compound having 2 to 4 hydroxyl groups and 2 to 18 carbon atoms and a mercaptocarboxylic acid having 2 to 7 carbon atoms or anhydride thereof.

4. The method of claim 3 wherein the curing agent contains N-methylol groups.

5. The composition of claim 1 adapted to be cured at 60° C. to 100° C., and wherein the binder consists essentially of an ester thiol prepared by condensation of a saturated organic polyhydroxy compound and a saturated aliphatic or aromatic mercapto carboxylic acid and an aminoplast.

* * * * *